United States Patent
Wang

(10) Patent No.: US 11,112,938 B2
(45) Date of Patent: Sep. 7, 2021

(54) METHOD AND APPARATUS FOR FILTERING OBJECT BY USING PRESSURE

(71) Applicant: HUAWEI TECHNOLOGIES CO., LTD., Guangdong (CN)

(72) Inventor: Tizheng Wang, Shenzhen (CN)

(73) Assignee: Huawei Technologies Co., Ltd. and Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 15/907,070

(22) Filed: Feb. 27, 2018

(65) Prior Publication Data
US 2018/0188911 A1 Jul. 5, 2018

Related U.S. Application Data

(63) Continuation of application No. PCT/CN2015/098228, filed on Dec. 22, 2015.

(51) Int. Cl.
*G06F 3/0481* (2013.01)
*G06F 3/0346* (2013.01)
(Continued)

(52) U.S. Cl.
CPC .......... *G06F 3/0482* (2013.01); *G06F 3/0488* (2013.01)

(58) Field of Classification Search
CPC ..... G06F 3/0482; G06F 3/0414; G06F 3/0488
See application file for complete search history.

(56) References Cited

U.S. PATENT DOCUMENTS 5,680,563 A * 10/1997 Edelman ................. G06F 9/451
715/835
2003/0074373 A1* 4/2003 Kaburagi ................ G06F 16/58
(Continued)

FOREIGN PATENT DOCUMENTS

| CN | 1808362 A | 7/2006 |
| CN | 102112946 A | 6/2011 |

(Continued)

OTHER PUBLICATIONS

Anonymous: "SOLVED:In Windows Explorer, Select Files by File Extension—DonationCoder.com", Oct. 18, 2012, XP055518665, 4 pages.
(Continued)

*Primary Examiner* — Jennifer N To
*Assistant Examiner* — K C Chen
(74) *Attorney, Agent, or Firm* — Fish & Richardson P.C.

(57) ABSTRACT

Embodiments of the present invention provide a method for filtering an object. The method includes: displaying an object management interface; detecting a location that is on the object management interface and that is touched by a user; determining, according to the touched location and a pressure value applied to the touched location, when the pressure value is greater than a preset threshold, a first type required by the user; and obtaining, through filtering in the object management interface, and presenting all objects of the first type. By using this method, the user can effectively obtain, through filtering in the object management interface, the presented objects of the first type, purposely locate, among disorderly messages or files, a type in which the user is interested, and filter out information of other types.

17 Claims, 10 Drawing Sheets

(51) Int. Cl.
*G06F 3/0338* (2013.01)
*G06F 3/01* (2006.01)
*G06T 7/50* (2017.01)
*G06F 3/0482* (2013.01)
*G06F 3/0488* (2013.01)

(56) References Cited

U.S. PATENT DOCUMENTS

| | | |
|---|---|---|
| 2004/0230599 A1 | 11/2004 | Moore et al. |
| 2010/0026640 A1 | 2/2010 | Kim et al. |
| 2012/0044153 A1 | 2/2012 | Arrasvuori et al. |
| 2012/0274591 A1 | 11/2012 | Rimas-Ribikauskas et al. |
| 2013/0097566 A1 | 4/2013 | Berglund |
| 2013/0293585 A1 | 11/2013 | Sudou |
| 2014/0033140 A1* | 1/2014 | Zeng ............... G06F 3/0488 715/863 |
| 2015/0026592 A1* | 1/2015 | Mohammed ....... G06F 3/04847 715/752 |
| 2015/0212669 A1* | 7/2015 | Garrison ............ G06F 16/248 715/825 |
| 2015/0215245 A1 | 7/2015 | Carlson et al. |
| 2016/0019311 A1 | 1/2016 | Robert et al. |
| 2016/0255494 A1 | 9/2016 | Shin et al. |
| 2016/0328140 A1 | 11/2016 | Zhang et al. |
| 2017/0123571 A1 | 5/2017 | Huang et al. |
| 2017/0131896 A1 | 5/2017 | Park et al. |
| 2017/0322693 A1* | 11/2017 | Zhang ................ G06F 3/0488 |
| 2017/0329565 A1* | 11/2017 | Xiao ..................... H04L 29/06 |

FOREIGN PATENT DOCUMENTS

| | | |
|---|---|---|
| CN | 103309998 A | 9/2013 |
| CN | 104063280 A | 9/2014 |
| CN | 105141496 A | 12/2015 |
| EP | 1674977 A2 | 6/2006 |
| JP | 2012003759 A | 1/2012 |
| JP | 2012113385 A | 6/2012 |
| KR | 20100014095 A | 2/2010 |
| KR | 20150040567 A | 4/2015 |
| WO | 2012098872 A1 | 7/2012 |
| WO | 2014206278 A1 | 12/2014 |

OTHER PUBLICATIONS

Extended European Search Report issued in European Application No. 15911048.5 dated Nov. 6, 2018, 11 pages.
International Search Report and Written Opinion in International Application No. PCT/CN2015/098228, dated Sep. 13, 2016, 13 pages.
Chinese Office Action issued in Chinese Application No. 201580083911.8 dated Mar. 5, 2019, 11 pages.
Chinese Search Report issued in Chinese Application No. 2015800839118 dated Feb. 25, 2019, 3 pages.
Office Action issued in Japanese Application No. 2018-517827 dated Apr. 22, 2019, 4 pages (with English translation).
Office Action issued in Korean Application No. 10-2018-7008451 dated Jul. 16, 2019, 11 pages (with English translation).
Office Action issued in Japanese Application No. 2018-517827 dated Jan. 6, 2020, 5 pages (with English translation).

* cited by examiner

METHOD AND APPARATUS FOR FILTERING OBJECT BY USING PRESSURE

CROSS-REFERENCE TO RELATED APPLICATIONS

This application is a continuation of International Application No. PCT/CN2015/098228, filed on Dec. 22, 2015, the disclosure of which is hereby incorporated by reference in its entirety.

TECHNICAL FIELD

The present invention relates to the terminal field, and specifically, to a method and an apparatus for filtering an object by using a pressure.

BACKGROUND

For an information exchange application, such as QQ, Post ba, WeChat, Weibo, or a forum, that is used in an intelligent terminal by a user, various images, audio, videos, text messages, links, network red envelopes, and the like always mix in a chat interface. There are usually hundreds of such messages, even thousands of messages in a lively group or community.

When there are too many messages, a user needs to spend a large amount of time identifying and selecting information in which the user is interested. However, such information is usually not ponderous text. The user pays more attention to which interesting videos are sent, which funny links are shared, which pleasant music there is, which beautiful images there are, how many red envelopes are not grabbed by the user, and the like in a chat group. Such content is more attractive than piled text messages.

Currently, the user can view these messages only by performing search by means of frequent page flips. If there are too many unrelated messages among these messages, an operation of the user becomes very complex. Due to all these, the user cannot effectively obtain, through filtering, content in which the user is interested, and cannot enjoy great experience.

SUMMARY

In view of this, embodiments of the present invention provide a method and an apparatus for filtering an object. The object mentioned in this application document includes but is not limited to the following types: an image type, a text type, a document type, a shared link type, a network red envelope (or a red envelope for short in the embodiments of the present invention) type, a video type, a music type, a contact type, a message type, an email type, an application note type, a search record type, a shopping record type, a post type in a forum, or an alarm prompt type, a call record type, or the like. These types may also be understood as an attribute that may be shared by multiple objects. A user may perform object filtering according to the types above. By using this method, the user rapidly determines, by means of a force touch (force touch), an object that is of a specific type and that the user intends to view, so that the user personalizes filtering in a large amount of complex and mixed information, and an object in which the user is interested is presented.

According to a first aspect, an embodiment of the present invention provides a method for filtering an object, where the method includes: displaying an object management interface, where the object management interface contains objects of at least two types; detecting a location that is on the object management interface and that is touched by a user, and a pressure value applied to the touched location; determining, when the pressure value is greater than a preset threshold, and an object can be identified according to the touched location, a type of the object as a first type, where the first type is one of the at least two types; and obtaining, through filtering in the object management interface, and presenting all objects of the first type.

According to a second aspect, an embodiment of the present invention provides a method for filtering an object, where the method includes: displaying an object management interface, where the object management interface contains objects of at least two types; detecting a location that is on the object management interface and that is touched by a user, and a pressure value applied to the touched location; when it is detected that the pressure value is greater than a preset threshold, and the touched location corresponds to a blank area, determining, according to a preset rule, a threshold interval in which the pressure value is, and determining a first type according to the threshold interval, where in the preset rule, a different threshold interval corresponds to a different type, the first type is one of the at least two types, and the blank area does not contain any object; and obtaining, through filtering in the object management interface, and presenting all objects of the first type.

According to the first aspect or the second aspect, in a possible design, the object is a message in a dialog box or a file in a folder.

According to the first aspect or the second aspect, in a possible design, the first type is an image type, an audio type, a video type, or a document type; and correspondingly, the object of the first type is an image, audio, a video, or a document.

According to the first aspect or the second aspect, in a possible design, the first type is network red envelope type or a shared link type, and the object of the first type is a network red envelope message or a shared link message.

According to the first aspect or the second aspect, in a possible design, the first type is a contact, and the object of the first type is a message published by the contact.

According to the first aspect or the second aspect, in a possible design, the obtaining, through filtering in the object management interface, and presenting all objects of the first type is specifically: obtaining, through filtering, all the objects of the first type from all the objects contained in the object management interface, and arranging and presenting all the objects of the first type in a forward chronological order.

According to the first aspect or the second aspect, in a possible design, the obtaining, through filtering in the object management interface, and presenting all objects of the first type is specifically: obtaining, through filtering, all the objects of the first type from all the objects contained in the object management interface, and arranging and presenting all the objects of the first type in a reverse chronological order.

According to the first aspect or the second aspect, in a possible design, a file of a specific format, such as mp3, mp4, wmv, doc, pdf, fly, rm, jpg, or png, may be obtained through filtering according to a specific file format of a file.

According to a third aspect, an embodiment of the present invention provides an apparatus for filtering an object, where the apparatus includes: a display module, configured to display an object management interface, where the object management interface contains objects of at least two types; a detection module, configured to detect a location that is on the object management interface displayed by the display module and that is touched by a user, and a pressure value applied to the touched location; a determining module, configured to obtain, when the detection module detects that the pressure value is greater than a preset threshold, and an object can be identified according to the touched location, a type of the object as a first type, where the first type is one of the at least two types; and a filtering module, configured to obtain, through filtering in the object management interface, and present on the display module, all objects of the first type.

According to a fourth aspect, an embodiment of the present invention provides an apparatus for filtering an object, where the apparatus includes: a display module, configured to display an object management interface, where the object management interface contains objects of at least two types; a detection module, configured to detect a location that is on the object management interface displayed by the display module and that is touched by a user, and a pressure value applied to the touched location; a determining module, configured to: when the detection module detects that the pressure value is greater than a preset threshold, and the touched location corresponds to a blank area, determine, according to a preset rule, a threshold interval in which the pressure value is, and determine a first type according to the threshold interval, where in the preset rule, a different threshold interval corresponds to a different type, the first type is one of the at least two types, and the blank area does not contain any object; and a filtering module, configured to obtain, through filtering in the object management interface, and present on the display module, all objects of the first type.

According to the third aspect or the fourth aspect, in a possible design, the object is a message in a dialog box or a file in a folder.

According to the third aspect or the fourth aspect, in a possible design, the first type is an image type, an audio type, a video type, or a document type; and correspondingly, the object of the first type is an image, audio, a video, or a document.

According to the third aspect or the fourth aspect, in a possible design, the filtering module is specifically configured to: obtain, through filtering, all the objects of the first type from all the objects contained in the object management interface, and arrange and present, on the display module, all the objects of the first type in a forward chronological order.

According to the third aspect or the fourth aspect, in a possible design, the filtering module is specifically configured to: obtain, through filtering, all the objects of the first type from all the objects contained in the object management interface, and arrange and present, on the display module, all the objects of the first type in a reverse chronological order.

According to the third aspect or the fourth aspect, in a possible design, the filtering module is specifically configured to: obtain, through filtering, all the objects of the first type from all the objects contained in the object management interface, and arrange and present, on the display module, all the objects of the first type in a forward chronological order.

According to the third aspect or the fourth aspect, in a possible design, a file of a specific format, such as mp3, mp4, wmv, doc, pdf, fly, rm, jpg, or png, may be obtained through filtering according to a specific file format of a file.

According to a fifth aspect, an embodiment of the present invention provides an intelligent terminal, where the terminal includes at least: a display screen, a processor, a memory, and a bus; the display screen, the processor, and the memory are connected to and communicate with each other by using the bus; and the display screen is configured to receive a user operation, the memory stores a program and an instruction, and the processor invokes the program and the instruction that are in the memory to perform and implement, according to the user operation received by the display screen, any one of the above methods for filtering an object.

According to technical solutions provided in the embodiments of the present invention, the object management interface is displayed; the location that is on the object management interface and that is touched by the user is detected; when the pressure value is greater than the preset threshold, a first attribute required by the user is determined according to the touched location and the pressure value applied to the touched location; and all objects of the first attribute are obtained through filtering in the object management interface and presented. By using this method, the user can effectively obtain, through filtering in the object management interface, a presented object of a specific type, purposely locate, among disorderly messages or files, a type in which the user is interested, and filter out information of other types. For example, in WeChat, only a network red envelope is obtained through filtering, and all information other than network red envelopes is filtered out. For another example, in a group chat, the user obtains, through filtering, messages published by only a person in which the user is interested. All these make perception of the user for the messages or the files more intuitive and more personalized. In addition, this may be implemented only by means of a simple force touch, thereby improving user experience, and making the user refreshing.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention. Furthermore, there are details and explanations of many features in the following embodiments. To avoid too much redundancy, the details and the explanations are applicable to a same feature under a same principle.

Figure 1A:
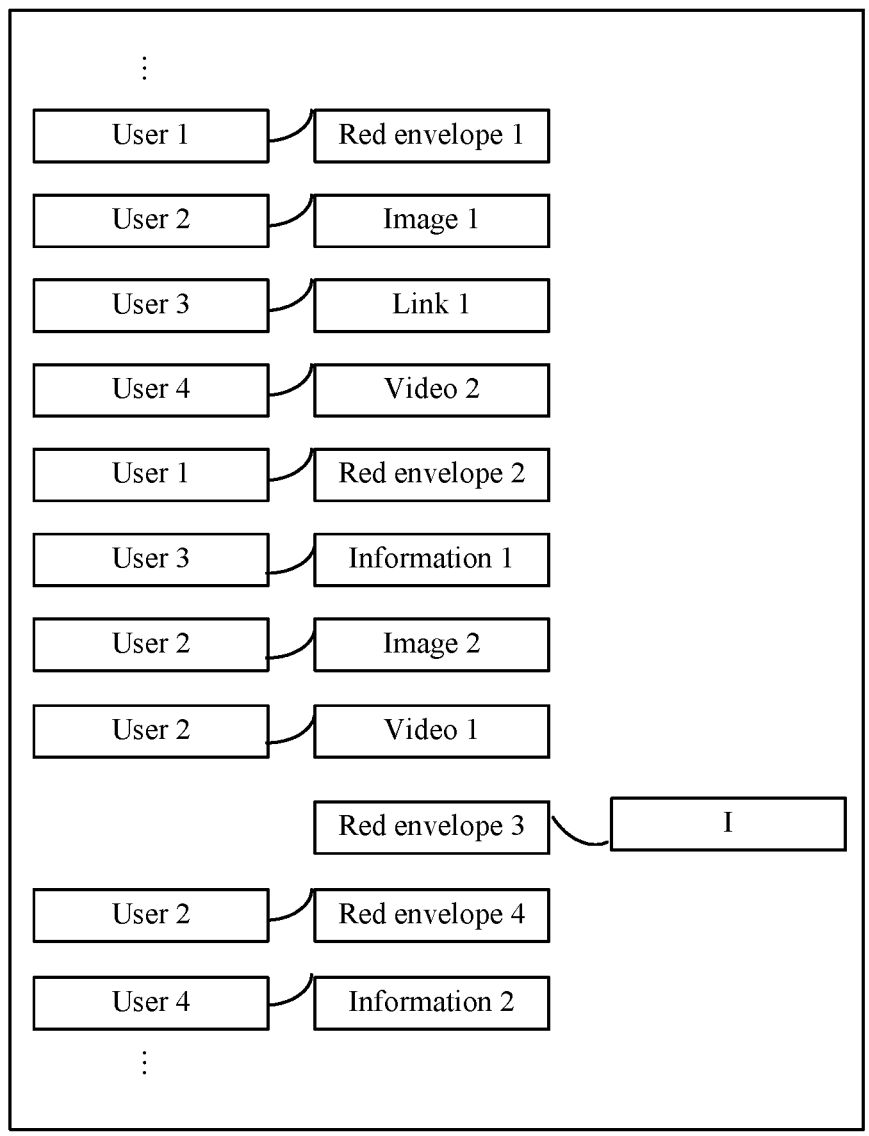
FIG. 1A shows an application interaction interface.
Figure 1B:
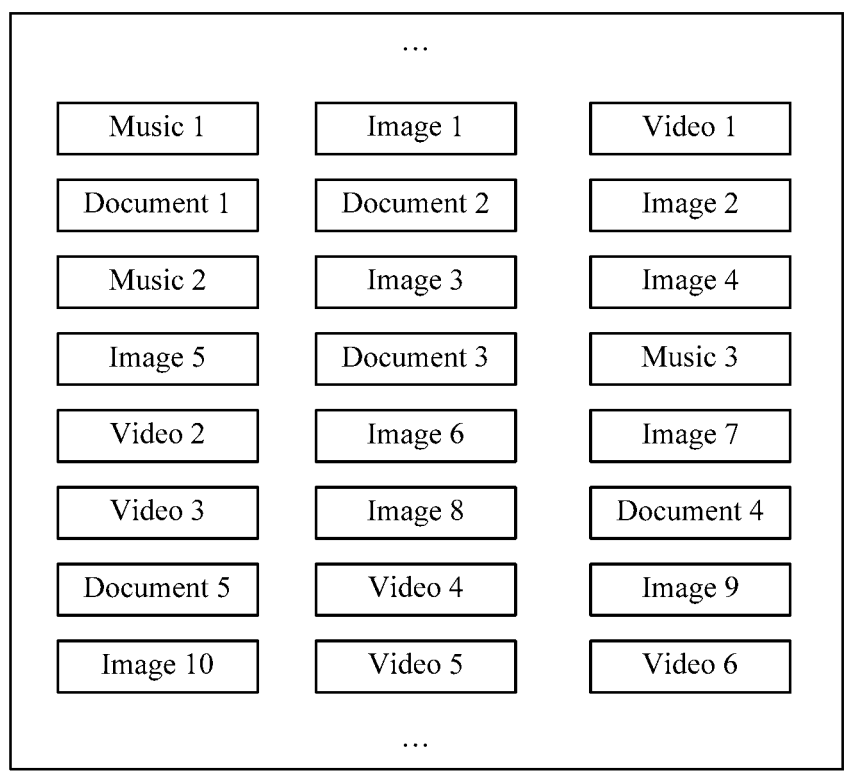
FIG. 1B shows a file list interface.

Referring to FIG. 1A and FIG. 1B, FIG. 1A and FIG. 1B are each a diagram of a common object management application scenario. For example, FIG. 1A is a common application interaction interface, especially that on which objects of various types, such as a network red envelope, an image (including an emoticon), a video, a document, text information, and a shared link, published by multiple users often appear during a group chat. FIG. 1B is a common file list interface. A file in a folder usually also contains various types, such as music/audio, a video/short video, an image, and a document. These objects are usually distributed without order, and it is difficult for a user to rapidly locate, among the objects, an object that the user desires. The present invention is combined with an operation of touching a screen by means of a force touch, and then an object type of an object that the user intends to obtain through filtering is identified, so that a user terminal can obtain through filtering and present objects of the object type according to the identified type.

Figure 2:
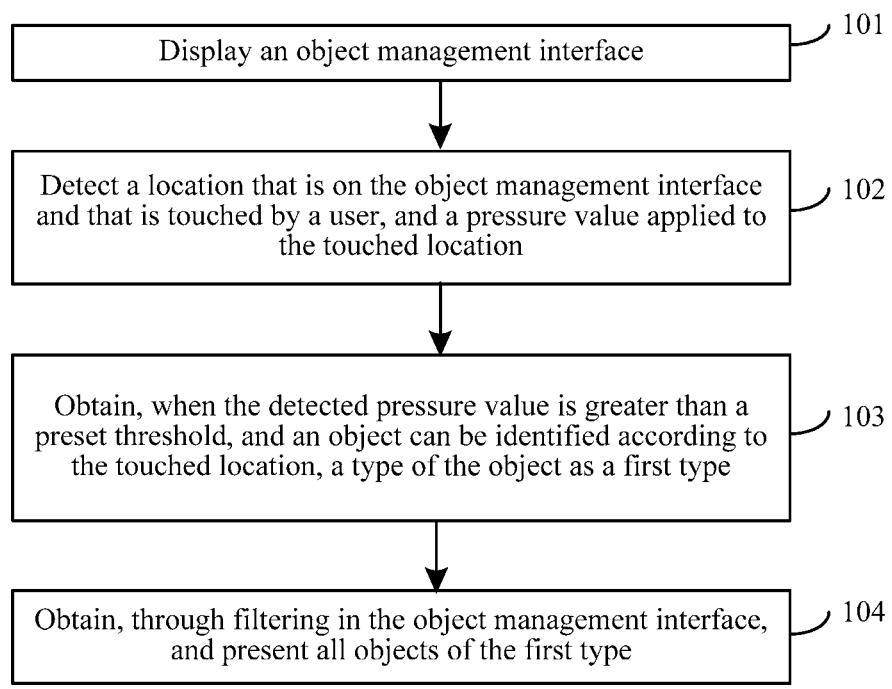
FIG. 2 is a method for filtering an object according to an embodiment of the present invention.

Referring to FIG. 2, FIG. 2 is a method for filtering an object according to an embodiment of the present invention. This method makes a user screen information more flexibly, makes an operation convenient, and improves user experience. This method specifically includes steps 101 to 104.

Step 101: Display an object management interface, where the object management interface contains M objects. The object mentioned in the present invention is a generalized concept, including all operation objects that may be operated in an intelligent terminal. For example, the operation objects are but are not merely limited to an image, audio, a video, a document, a message in an application, a folder, an SMS message, an icon, a call record, a contact, and the like. A value of M is usually greater than 2.

The object management interface mentioned in the present invention is also a generalized concept, including all interfaces that may display and operate the object of any type described above. For example, the interface is a file display interface of a folder, a chat interface of a client, a call record interface, an interface of a commodity in a shopping cart, a post reply interaction interface in a forum, or a simple message dialog box. Seeing from a level of a computer, any object management interface actually corresponds to one folder. In a specific implementation process, a user may enter an object management interface by means of some operations in the prior art. Due to a limited screen size of an intelligent terminal, an object management interface is not necessarily capable of presenting in a screen all objects in the object management interface. In an existing application, the user may browse multiple objects in the object management interface by means of a page flip, dragging, or other means. Usually, in a process of the page flip and the dragging, an outer bezel of the object management interface does not change, and only objects in the object management interface move. The intelligent terminal mentioned in this patent includes but is not limited to a smartphone, a tablet computer, a wearable device, or other terminal devices, especially mobile terminal devices.

Step 102: Detect a location that is on the object management interface and that is touched by a user, and a pressure value applied to the touched location.

When the user operates on the object management interface, the intelligent terminal detects the location of touching the screen by the user, and also detects the pressure value of touching the screen. These may be obtained by using a device such as a pressure sensor that is integrated in the screen of the intelligent terminal.

Step 103: Obtain, when the detected pressure value is greater than a preset threshold, and an object can be identified according to the touched location, a type of the object as a first type, where the first type is one of the at least two types mentioned in step 101.

This is one of innovation points of the present invention, that is, a function of obtaining an object type by performing triggering by means of a force touch. In the prior art, the force touch is not distinguished from a normal force touching operation. The preset threshold mentioned in the present invention is greater than a pressure sensing value that can trigger a normal operation. For example, when a pressure applied by the user reaches F1, the user may only implement an operation of triggering selection by means of touch and hold, or an operation of triggering a subsequent edit by means of a short tap; and when the pressure applied by the user reaches F2, the intelligent terminal may be triggered to obtain the type of the object, where F2 is greater than F1, and F2 is the preset threshold, and may be set at delivery by a vendor of the intelligent terminal, or be defined by the user.

Furthermore, that the user touches the screen to trigger selecting an object or executing a subsequent operation, and that the intelligent terminal identifies, by using the location touched by the user, an objective object to be operated are both existing technologies in this field. It should be understood that in the present invention, performing a touching operation on an object refers to touching a display location that is in the current screen and that corresponds to the object, and being capable of triggering identifying and editing operations on the object.

Step 104: Obtain, through filtering in the object management interface, and present all objects of the first type.

Furthermore, when the user triggers a function of filtering an object, the intelligent terminal may further display some prompt operations. For example, the user is prompted that objects of which type are to be obtained through filtering.

Due to different user operation scenarios, implementations of the above technical solutions are various. The following is to describe the above method in detail by using specific examples. Any technical solution and application scenario on which equivalent replacement may be made should fall within the protection scope of the present invention.

Example 1

Figure 3:
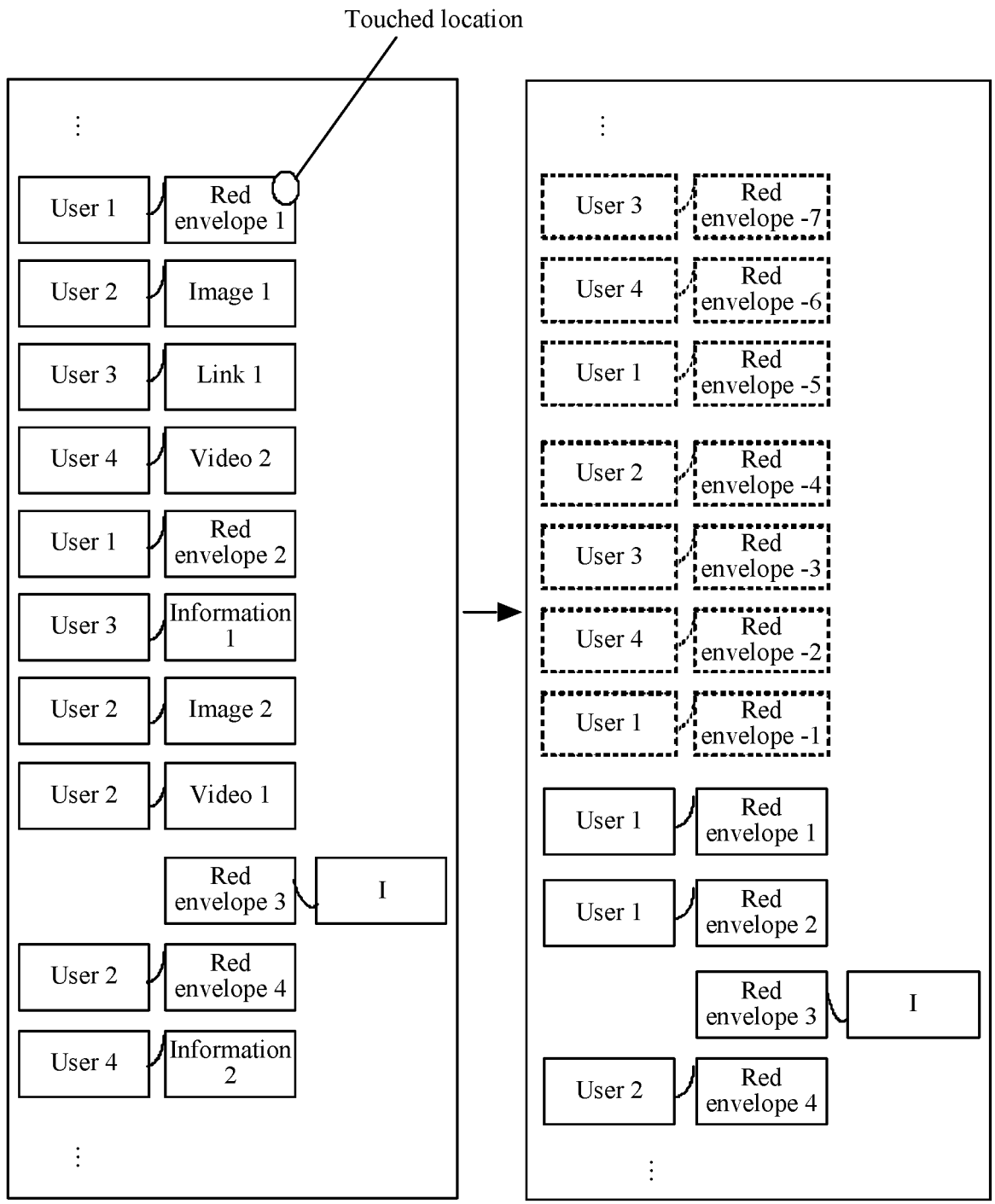
FIG. 3 is Example 1 of a method for filtering an object according to an embodiment of the present invention.

Referring to FIG. 3, FIG. 3 is Example 1 of a method for filtering an object according to an embodiment of the present invention. A user intends to manage a chat record, and the chat record displayed in a current screen is shown in the left of FIG. 3. User chat content includes object entries of multiple types and of multiple users, and the objects include a shared image, link, video, and network red envelope (which are displayed in the figure as examples, and are not of actual sizes), and are further mixed with various text information. Due to the limited screen, not all the objects in the current chat record are shown in the left of FIG. 3. For ease of description, the objects in this embodiment of the present invention are numbered correspondingly, only intending to conveniently point out which object it is, and not limiting content or a form of expression of the object.

An intelligent terminal displays an object management interface of an application (a type or a form of the application is not limited) in the left of FIG. 3. Assuming that a current user (I) intends to only open a red envelope in the object management interface, and pays little attention to objects of other types, the user may perform a force touch on any red envelope, for example, on a circle on red envelope 1 (a specific location is not limited, and any function area on which the red envelope may be selected or operated may be equivalent), so that the intelligent terminal can determine that the user intends to operate the red envelope 1. When the intelligent terminal detects that a pressure applied by the user to a location that is on the screen and that corresponds to the red envelope 1 is greater than a preset threshold, for example, when the preset threshold is 1.5N and the detected pressure is 2N, the intelligent terminal obtains a red envelope type according to the touch on the red envelope 1, and obtains, through filtering, from all objects in the object management interface, and presents in the object management interface, all network red envelopes. As shown in the right of FIG. 3, a red envelope-1, a red envelope-2, . . . , and a red envelope-7 that can be displayed in the screen are red envelopes that are not shown in the left of FIG. 3, and a red envelope closer to a bottom part of the screen has a later publishing time point. The user then may tap and open each red envelope one by one, to satisfy a pleasure of opening red envelopes in batches, being different from that, in the prior art, a red envelope may be found from disorderly messages only by means of multiple page flips, and bringing good experience for the user. If there are too many red envelopes, the current screen is not necessarily capable of displaying all the red envelopes after filtering, and the user may view more network red envelopes by means of a page flip or other means.

It should also be noted that, in this embodiment of the present invention, a circle in each accompanying drawing is merely a representation, and does not limit sizes of a touched location and a touched point during actual operation. Because use operations of the user are diversified, any operation of which a function may be equivalent to a function effect of an operation in the present invention should fall with the technical solutions of the present invention. Details are not described again in the following.

In a specific implementation process of the embodiments of the present invention, the object displayed by the object management interface may be a thumbnail of the object, or a complete image of the object. Sizes of the thumbnails vary greatly due to different settings of a terminal system and an application. The thumbnail is not limited in this application. Thumbnails of multiple objects may be tiled, arranged, and displayed in one screen. A display method may be similar to vertical arrangement in FIG. 3, that is, arranging and displaying in a forward chronological order. Usually, objects last published are displayed in the current screen, and these objects are objects of a same type that are obtained by the user through filtering. Optionally, the multiple objects may alternatively be arranged and displayed in a reverse chronological order. For example, the objects obtained through filtering are arranged, and an object closer to a top part of the screen has a later publishing time point. Forward or reverse arrangement may be set by default by the intelligent terminal, or be freely set by the user.

It should be understood that, in this embodiment of the present invention, if there are fewer objects after filtering, the objects may be all displayed in the current screen.

In a specific implementation process, the first type in the method is not merely limited to the red envelope type, and also includes an image type, an audio type, a video type, a text message type, a shared link type, a document type, and the like. Correspondingly, the object is not merely limited to the red envelope, and also includes an image, audio, a video, a text message, a shared link, a document, and the like in the object management interface.

Different from information browsing and viewing in the past, messages in which the user is interested may be aggregated from hundreds or thousands of messages provided that the user performs a simple force touch on a message in which the user is interested, and, thereby greatly reducing a quantity of the page flips, and effectively reducing operation costs of the user. In addition, the user may personalize selecting an object of a specific type, and more purposely view and browse content types in which the user is interested. Adopting the selection method in this example undoubtedly brings great convenience to the user.

Example 2

Figure 4:
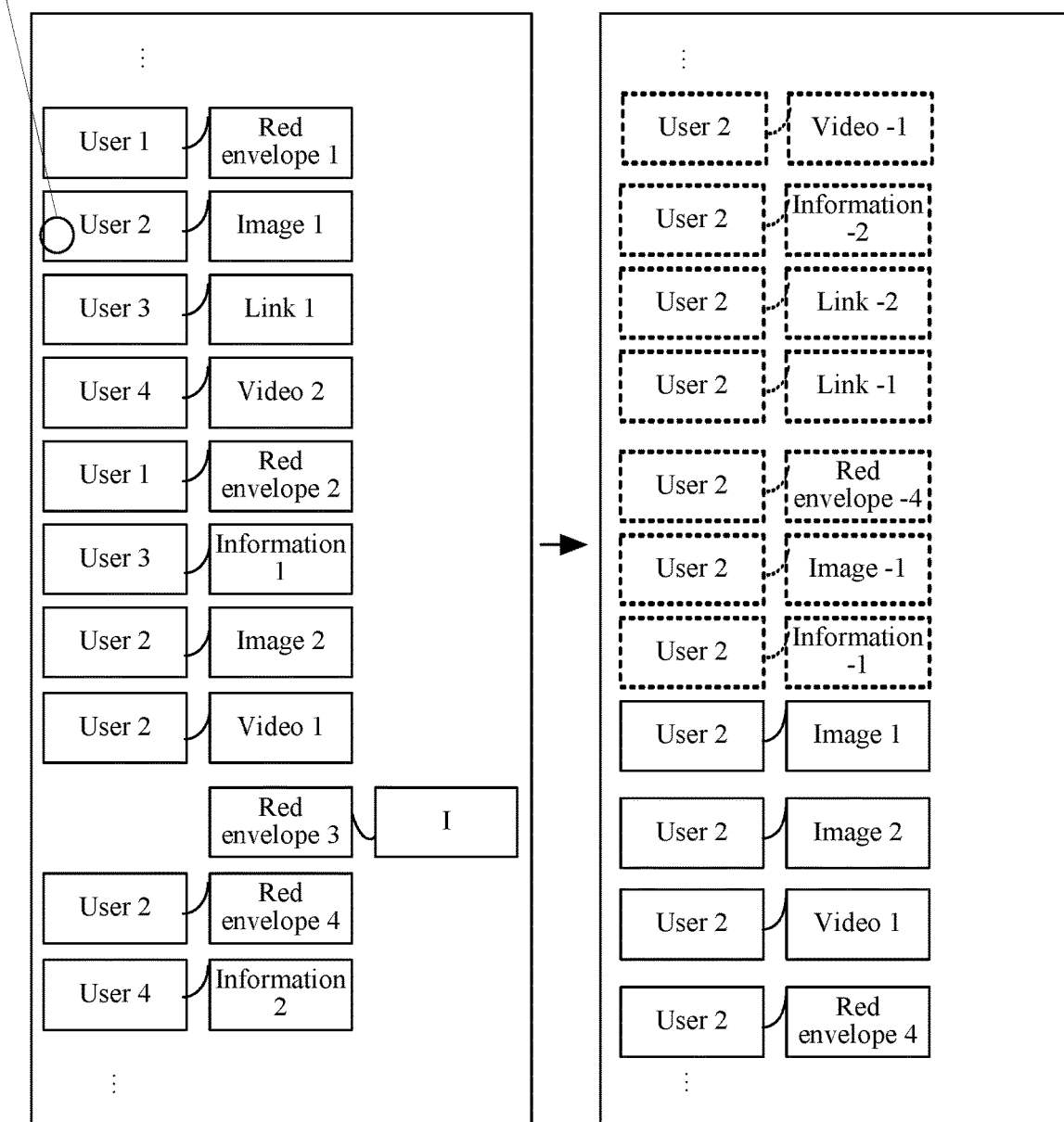
FIG. 4 is Example 2 of a method for filtering an object according to an embodiment of the present invention.

Referring to FIG. 4, FIG. 4 is Example 2 of a method for filtering an object according to an embodiment of the present invention. For ease of clear description, a user intends to manage a chat record, and a current chat record is shown in the left of FIG. 4. User chat content includes objects of multiple types and of multiple users, and the objects include a shared image, link, video, and network red envelope (which are displayed in the figure as examples, and are not of actual sizes), and are further mixed with various text information. Due to the limited screen, not all the objects in the current chat record are shown in the left of FIG. 4.

An intelligent terminal displays an object management interface of an application (a type or a form of the application is not limited) in the left of FIG. 4. Assuming that a current user (I) intends to only pay attention to, in an object management interface, a message published by a user 2, and pays little attention to a message published by another user, the user may perform a force touch on any contact icon corresponding to the user 2, for example, on a circle shown in the left of FIG. 4 (a specific location is not limited, and any function area on which the user 2 may be selected or operated may be equivalent), so that the intelligent terminal can determine that the user intends to operate the user 2. When the intelligent terminal detects that a pressure applied by the user to the contact icon of the user 2 is greater than a preset threshold, for example, when the preset threshold is 2N and the detected pressure is 3N, the intelligent terminal obtains a user 2 attribute according to a touch on the contact icon of the user 2, and obtains through filtering, from all objects in the object management interface, and presents in the object management interface, all objects published by the user 2. As shown in the right of FIG. 4, a video-1, information-1, information-2, a link-1, a link-2, a red envelope-4, and an image-1 displayed in the current screen are objects that are published by the user 2 and that are not shown in the left of FIG. 4, and an object closer to a bottom part of the screen has a later publishing time point. If there are too many messages published by the user 2, the current screen is not necessarily capable of displaying all the objects after filtering, and the user may view and browse more messages published by the user 2 by means of a page flip or other means. The user then may browse, in batches, all the objects published by the user 2, and does not miss an important message published by the user 2, being different from that, in the prior art, a key message published by the user 2 may be found from disorderly messages only by means of multiple page flips, and bringing good experience for the current user.

In a specific implementation process, the object displayed by the object management interface may be a thumbnail of the object published by the user 2, or a complete image of the object published by the user 2. Sizes of the thumbnails vary greatly due to different settings of a terminal system and an application. The thumbnail is not limited in this application. Thumbnails of multiple objects may be tiled, arranged, and displayed in one screen. A display method may be similar to vertical arrangement in the right of FIG. 4, that is, arranging and displaying in a forward chronological order. Usually, objects last published are displayed in the current screen, and these objects are objects that are published by a same user and that are obtained by the user through filtering. Optionally, the multiple objects may alternatively be arranged and displayed in a reverse chronological order. For example, the objects obtained through filtering are arranged, and an object closer to a top part of the screen has a later publishing time point. Forward or reverse arrangement may be set by default by the intelligent terminal, or be freely set by the user.

Furthermore, in this embodiment of the present invention, when a touched location is related, the touched location is not limited to a marked location in each accompanying drawing, and equivalent replacement may be made on any location that can trigger a same function based on an operation of a same principle.

Example 3

Figure 5:
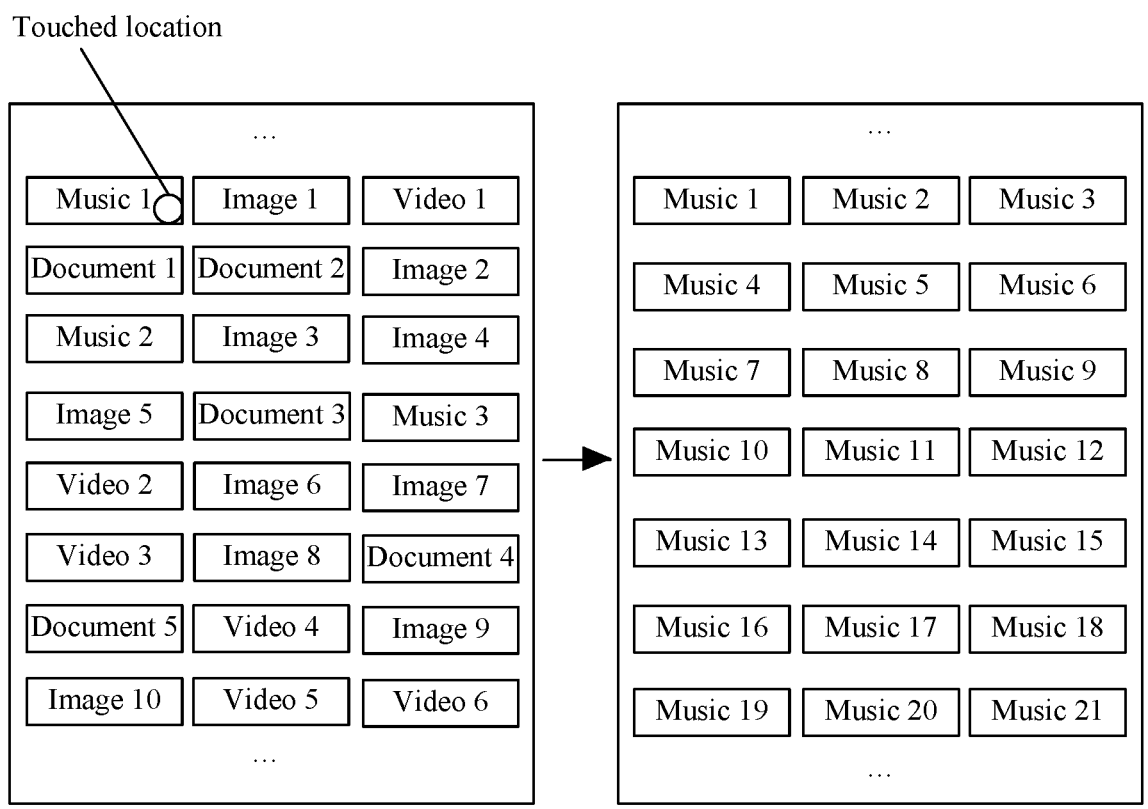
FIG. 5 is Example 3 of a method for filtering an object according to an embodiment of the present invention.

Referring to FIG. 5, FIG. 5 is Example 3 of a method for filtering an object according to an embodiment of the present invention. A user intends to manage files in a folder, and folder content displayed in a current screen is shown in the left of FIG. 5. The folder includes objects of multiple types, and the objects include an image, a video, a network, a document, and the like. Due to the limited screen, not all the files in the folder are shown in FIG. 5.

Assuming that the user only intends to view a music file in the folder, and pays little attention to a file of another type, the user may perform a force touch on any music file, for example, on a circle on music 1 (a specific location is not limited, and any function area on which the music 1 may be selected or operated may be equivalent), so that the intelligent terminal can determine that the user intends to operate the file, that is, the music 1. When the intelligent terminal detects that a pressure applied by the user to a location that is on the screen and that corresponds to the music 1 is greater than a preset threshold, for example, when the preset threshold is 3N and the detected pressure is 4N, the intelligent terminal identifies a music type according to a touch operation on the music 1, and obtains through filtering, from all objects in the folder, and presents in the object management interface, all music files. As shown in the right of FIG. 5, music 4 to music 21 are music files that are not shown in the left of FIG. 5, an ellipsis part represents more music files that are not shown, and the user may view more music files by means of a page flip or other means. Furthermore, the music files obtained through filtering may be arranged in a forward chronological order or in a reverse chronological order; and may alternatively be arranged in a forward or a reverse order according to a file name or file size. Which arrangement manner is specifically adopted may be set by default by the intelligent terminal, or be freely set by the user.

The user may then centralize and view the music files in the folder, being different from that, in the prior art, music in which the user is interested may be found from disorderly messages only by means of multiple page flips, and bringing good experience for the user.

In a specific implementation process, the object displayed by the object management interface may be a thumbnail of the object, or a complete image of the object. Sizes of the thumbnails vary greatly due to different settings of a terminal system and an application. The thumbnail is not limited in this application.

In a specific implementation process, a first type in the method is not merely limited to the music type, and also includes an image type, a video type, a document type, and the like shown in the figure. Correspondingly, the object is not merely limited to the music, and also includes an image, a video, a document, and the like in the object management interface.

Different from file browsing and viewing in the past, files in which the user is interested may be aggregated from disorderly files provided that the user performs a simple force touch on a message in which the user is interested, thereby greatly reducing a quantity of the page flips, and effectively reducing operation costs of the user. In addition, the user may personalize selecting a file of a specific type. Adopting the selection method in this example undoubtedly brings great convenience to the user.

Figure 6:
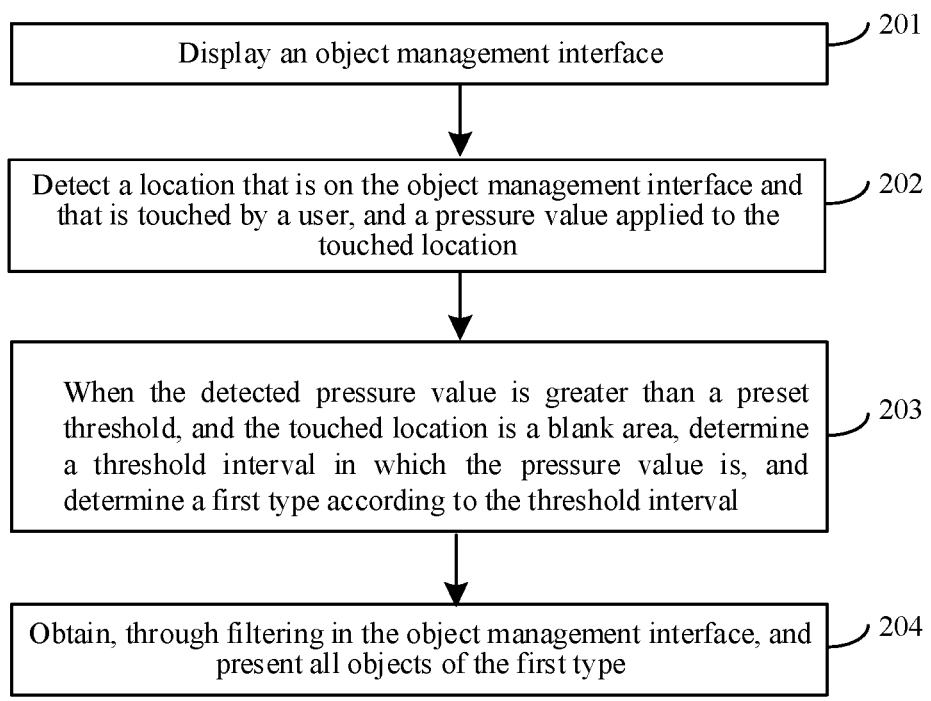
FIG. 6 is another method for filtering an object according to an embodiment of the present invention.

Referring to FIG. 6, FIG. 6 is another method for filtering an object according to an embodiment of the present invention. This method makes a user screen information more flexibly, makes an operation convenient, and improves user experience. This method specifically includes steps 201 to 204.

Step 201: Display an object management interface, where the object management interface contains M objects. The object mentioned in the present invention is a generalized concept, including all operation objects that may be operated in an intelligent terminal. For example, the operation objects are but are not merely limited to an image, audio, a video, a document, a message in an application, a folder, an SMS message, an icon, a call record, a contact, and the like. A value of M is usually greater than 2.

Step 202: Detect a location that is on the object management interface and that is touched by a user, and a pressure value applied to the touched location.

When the user operates on the object management interface, the intelligent terminal detects the location of touching a screen by the user, and also detects the pressure value of touching the screen. These may be obtained by using a device such as a pressure sensor that is integrated in the screen of the intelligent terminal.

Step 203: When the detected pressure value is greater than a preset threshold, and the touched location is a blank area, determine a threshold interval in which the pressure value is, and determine a first type according to the threshold interval, where the first type is one of the at least two types mentioned in step 201.

This is one of innovation points of the present invention, that is, a function of obtaining an object type by performing triggering by means of a force touch. In the prior art, the force touch is not distinguished from a normal force touching operation. The preset threshold mentioned in the present invention is greater than a pressure sensing value that can trigger a normal operation. For example, when a pressure applied by the user reaches F1, the user may only implement an operation of triggering selection by means of touch and hold, or an operation of triggering a subsequent edit by means of a short tap; and when the pressure applied by the user reaches F2, the intelligent terminal may be triggered to obtain the type of the object, where F2 is greater than F1, and F2 is the preset threshold, and may be set at delivery by a vendor of the intelligent terminal, or be defined by the user.

It should be understood that the blank area refers to an area that is in the current screen and that does not correspond to any object. Tapping the blank area by the user will not trigger any edit operation on any object.

When the pressure value applied by the user to the blank area is greater than F2, the threshold interval corresponding to the pressure value is determined. A correspondence between the threshold interval and the object type is prestored in the intelligent terminal, and the correspondence may be prestored by the intelligent terminal, or preset by the user. For example, an object type corresponding to (F2, F3] is an image, and an object type corresponding to (F3, F4] is a video, where F4 is greater than F3, and F3 is greater than F2. A different threshold interval corresponds to a different object type.

Step 204: Obtain, through filtering in the object management interface, and present all objects of the first type.

Furthermore, when the user triggers a function of filtering an object, the intelligent terminal may further display some prompt operations. For example, the user is prompted that objects of which type are to be obtained through filtering.

Due to different user operation scenarios, implementations of the above technical solutions are various. The following is to describe the above method in detail by using specific examples. Any technical solution and application scenario on which equivalent replacement may be made should fall within the protection scope of the present invention.

Example 4

Figure 7:
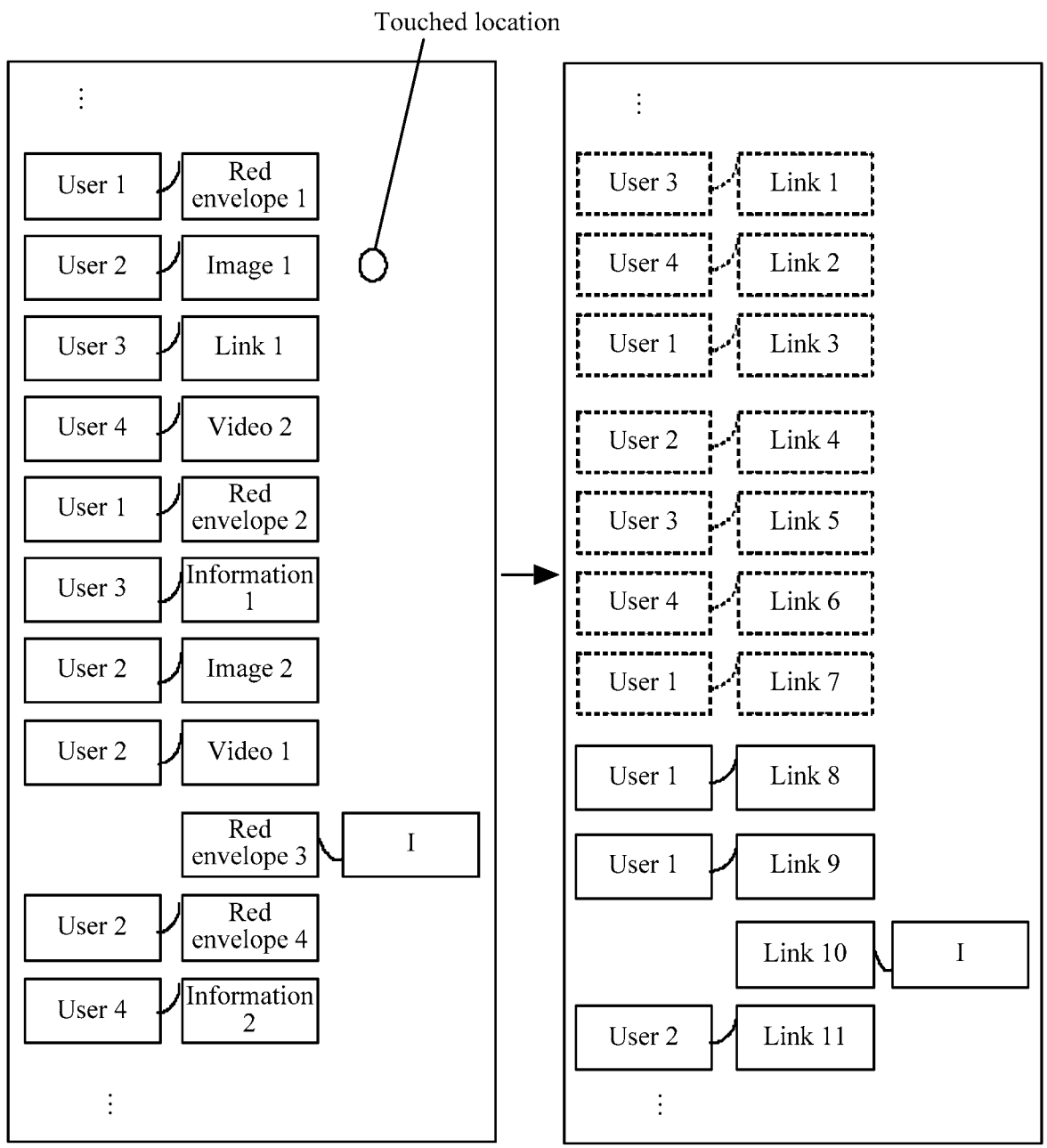
FIG. 7 is Example 4 of a method for selecting an object according to an embodiment of the present invention.

Referring to FIG. 7, FIG. 7 is Example 4 of a method for selecting an object according to an embodiment of the present invention. A user intends to manage a chat record, and the chat record displayed in a current screen is shown in the left of FIG. 7. User chat content includes object entries of multiple types and of multiple users, and the objects include a shared image, link, video, and network red envelope (which are displayed in the figure as examples, and are not of actual sizes), and are further mixed with various text information. Due to the limited screen, not all the objects are shown in the left of FIG. 7.

Assuming that any user (for example, I) participating in a chat intends to only view a shared link in an object management interface, to search whether there is some essence content, and pays little attention to an object of another type, the user may perform a force touch on any blank area, for example, on a circle in the left of FIG. 7 (a specific location is not limited, as long as it is a blank area). When the intelligent terminal detects that a pressure applied by the user to the blank area is greater than a preset threshold, for example, when the preset threshold is 2N and the detected pressure is 2.8N, the intelligent terminal determines, according to a threshold interval in which 2.8N is, an object type corresponding to the threshold interval, and obtains through filtering, from all objects in the object management interface, and presents in the object management interface, all objects of the object type. For example, a correspondence prestored by the intelligent terminal is: an object type corresponding to a threshold interval (2N, 3N] is a network link, an object type corresponding to a threshold interval (3N, 4N] is an image, an object type corresponding to a threshold interval (4N, 5N] is a video, or the like. In this embodiment of the present invention, a setting of a specific preset threshold, a setting of a threshold interval, and each threshold interval corresponds to which object type may be defined by the user or initially set by the intelligent terminal. As shown in the right of FIG. 7, link 2 to link 11 are shared links that are not shown in the left of FIG. 7, and the user may view more links that are not shown by means of a page flip. The user then may view content in any link in batches, being different from that, in the prior art, a shared link may be found from disorderly messages only by means of multiple page flips, and bringing good experience for the user.

It should also be noted that, in this embodiment of the present invention, a circle in each accompanying drawing is merely a representation, and does not limit sizes of a touched location and a touched point during actual operation. Because use operations of the user are diversified, any operation of which a function may be equivalent to a function effect of an operation in the present invention should fall with the technical solutions of the present invention. Details are not described again in the following.

Optionally, the links obtained through filtering may be arranged and displayed in a forward or a reverse chronological order. Forward or reverse arrangement may be set by default by the intelligent terminal, or be freely set by the user.

In a specific implementation process, a first type in the method is not merely limited to a link type, and also includes an image type, an audio type, a video type, a text message type, a network red envelope type, a document type, and the like. Correspondingly, the object is not merely limited to the link, and also includes an image, audio, a video, a text message, a network red envelope, a document, and the like in the object management interface.

Different from information browsing and viewing in the past, objects in which the user is interested may be aggregated provided that the user performs a simple force touch on the blank area, thereby greatly reducing a quantity of the page flips, and effectively reducing operation costs of the user. In addition, the user may personalize selecting an object of a specific type, and more purposely view and browse content in which the user is interested. Adopting the selection method in this example undoubtedly brings great convenience to the user.

Example 5

Figure 8:
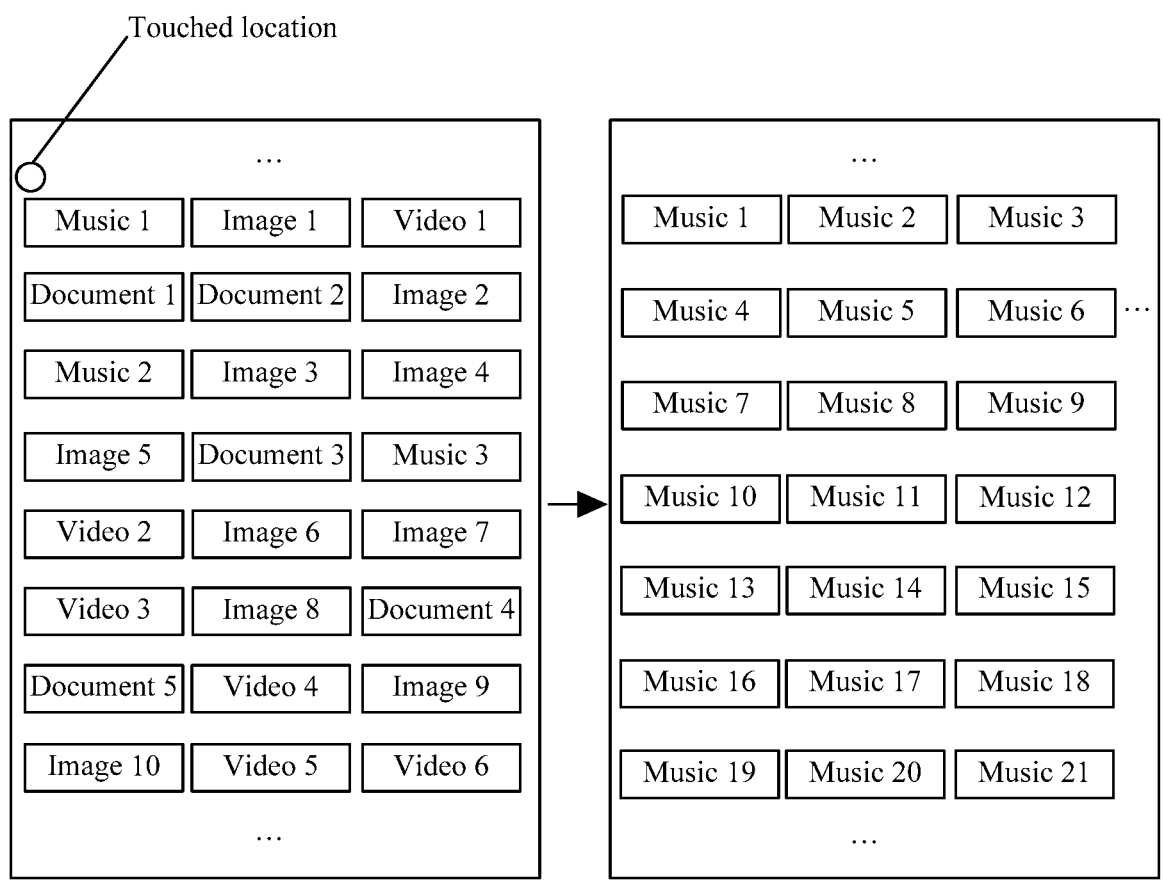
FIG. 8 is Example 5 of a method for selecting an object according to an embodiment of the present invention.

Referring to FIG. 8, FIG. 8 is Example 5 of a method for selecting an object according to an embodiment of the present invention. Methods 201 to 204 are also applicable to classification and viewing of files in a folder. Specific Example 5 is similar to Example 4, and differs from Example 4 in that an application scenario is to classify files in a file display interface of a folder. Types of the files include an image type, a music type, a video type, a document type, and the like. When a touch pressure value on a blank area touched by a user is greater than a preset threshold, an object type to be obtained through filtering is determined according to a threshold interval in which the touch pressure value is. A different threshold interval corresponds to a different object type. Because an implementation is similar, a specific example is not described again. A final effect of Example 5 (in the right of FIG. 8) is similar to a final effect of Example 3 (in the right of FIG. 5).

It should be understood that the above examples are merely several of multiple embodiments of the present invention. Any application scenario in which the object type can be determined by means of a force touch, to perform filtering on the objects in the object display interface should fall within the protection scope of the present invention. The object type may be understood as a common attribute of multiple objects.

Figure 9:
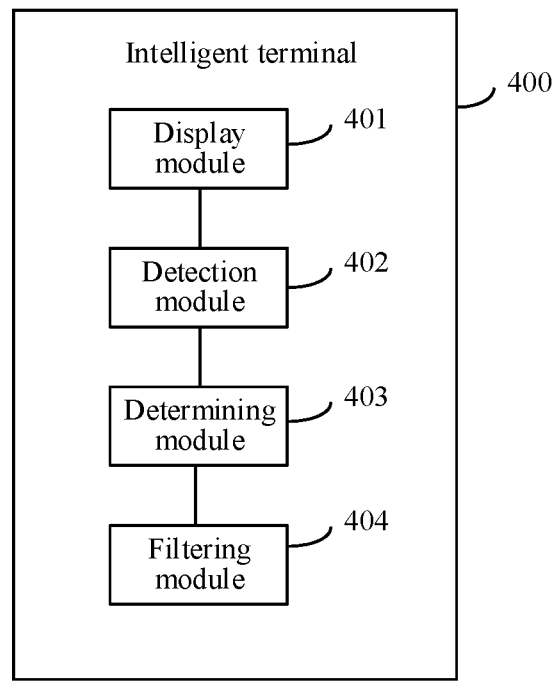
FIG. 9 is a function module structural diagram of an intelligent terminal according to an embodiment of the present invention.

Referring to FIG. 9, FIG. 9 is a function module structural diagram of an intelligent terminal according to an embodiment of the present invention. The intelligent terminal 400 may be a wearable device, a smartphone, a tablet computer, or other intelligent terminals, especially mobile intelligent terminals.

The intelligent terminal includes a display module 401, a detection module 402, a determining module 403, and a filtering module 404. Because there are many possible implementations, the following continues to describe the apparatus by using examples. Any technical solution on which equivalent replacement may be made should fall within the protection scope of the present invention.

Example 6

An intelligent terminal 400, includes:

a display module 401, configured to display an object management interface, where the object management interface contains objects of at least two types, and the display module may be implemented by using a display screen of a mobile phone;

a detection module 402, configured to: detect input that is on the object management interface displayed by the display module 401 and that is of a user, and detect a location that is on the object management interface displayed by the display module and that is touched by the user, and a pressure value applied to the touched location, where the detection module 402 may be implemented by using a pressure sensor integrated in the screen of the mobile phone, and a processor invokes a program to perform specific analysis;

a determining module 403, configured to determine, when the detection module 402 detects that the pressure value is greater than a preset threshold, and an object can be identified according to the touched location, a type of the object as a first type, where the first type is one of the at least two types, and the determining module 403 may be implemented by invoking a program by the processor; and a filtering module 404, configured to: obtain, through filtering in the object management interface, and present on the display module 401, all objects of the first type, where the filtering module 404 may be implemented by invoking a program by the processor.

An equivalent concept corresponding to the above method embodiments is not described herein again. Any equivalent replacement made without creative efforts by a person skilled in the art shall fall within the protection scope of the present invention, not being differentiated and limited by a method and an apparatus.

For example, in Example 1 described above, the display module 401 displays the object management interface shown in the left of FIG. 3. When the detection module 402 detects that the pressure applied to the red envelope 1 by the user is greater than the preset threshold, the determining module 403 obtains the red envelope type, and the filtering module 404 obtains through filtering according to the red envelope type, from all the objects in the object management interface, and presents in the display module 401, all the network red envelopes.

For example, in Example 2 described above, the display module 401 displays the object management interface shown in the left of FIG. 4. When the detection module 402 detects that the pressure applied to the contact icon of the user 2 by the user is greater than the preset threshold, the determining module 403 determines that the contact type is the user 2, which may alternatively be understood as a user 2 attribute, and the filtering module 404 obtains through filtering according to the user 2 attribute, from all the objects in the object management interface, and presents in the display module 401, all the objects published by the user 2.

For example, in Example 3 described above, the display module 401 displays the object management interface shown in the left of FIG. 5. When the detection module 402 detects that the pressure applied to the music 1 by the user is greater than the preset threshold, the determining module 403 determines the music type, which may alternatively be understood as that the type of the objects to be obtained through filtering is music, and the filtering module 404 obtains through filtering according to the music type, from all the objects in the object management interface, and presents in the display module 401, all the music files.

All technical solutions that can be included by the above methods 101 to 104 may be implemented correspondingly by using the terminal 400.

According to the intelligent terminal provided in the present invention, different from file browsing and viewing in the past, objects of a type in which the user is interested may be aggregated from disorderly objects of various types provided that the intelligent terminal 400 identifies a force touch on the object performed by the user, thereby greatly reducing a quantity of page flips, and effectively reducing operation costs of the user. In addition, the user may personalize selecting an object of a specific type. Adopting the selection method in this example undoubtedly brings great convenience to the user.

Example 7

An intelligent terminal 400, includes:

a display module 401, configured to display an object management interface, where the object management interface contains objects of at least two types, and the display module may be implemented by using a display screen of a mobile phone;

a detection module 402, configured to: detect a location that is on the object management interface displayed by the display module 401 and that is touched by a user, and a pressure value applied to the touched location, where the detection module 402 may be implemented by using a pressure sensor integrated in the screen of the mobile phone, and a processor invokes a program to perform specific analysis;

a determining module 403, configured to: when the detection module 402 detects that the pressure value is greater than a preset threshold, and the touched location corresponds to a blank area, determine, according to a preset rule, a threshold interval in which the pressure value is, and determine a first type according to the threshold interval, where in the preset rule, a different threshold interval corresponds to a different type, the first type is one of the at least two types, and the blank area does not contain any object; and the determining module 403 may be implemented by invoking a program by the processor, and the preset rule may be stored in a memory; and a filtering module 404, configured to: obtain, through filtering in the object management interface, and present on the display module 401, all objects of the first type, where the filtering module 404 may be implemented by invoking a program by the processor.

An equivalent concept corresponding to the above method embodiments is not described herein again. Any equivalent replacement made without creative efforts by a person skilled in the art shall fall within the protection scope of the present invention, not being differentiated and limited by a method and an apparatus.

For example, in Example 4 described above, the display module 401 displays the object management interface shown in the left of FIG. 7. When the detection module 402 detects that the pressure applied to the blank area by the user is greater than the preset threshold, the determining module 403 determines the threshold interval corresponding to the pressure value, and determines, according to the prestored correspondence between the threshold interval and the object type, that the type of the objects needing to be obtained through filtering is the shared link, and the filtering module 404 obtains through filtering according to the shared link type, from all the objects in the object management interface, and presents in the display module 401, all the shared links.

According to the intelligent terminal provided in the present invention, different from file browsing and viewing in the past, objects of a type in which the user is interested may be aggregated from disorderly objects of various types by identifying a force of a force touch provided that the intelligent terminal 400 identifies the force touch on the object performed by the user, thereby greatly reducing a quantity of page flips, and effectively reducing operation costs of the user. In addition, the user may personalize selecting an object of a specific type. Adopting the selection method in this example undoubtedly brings great convenience to the user.

Figure 10:
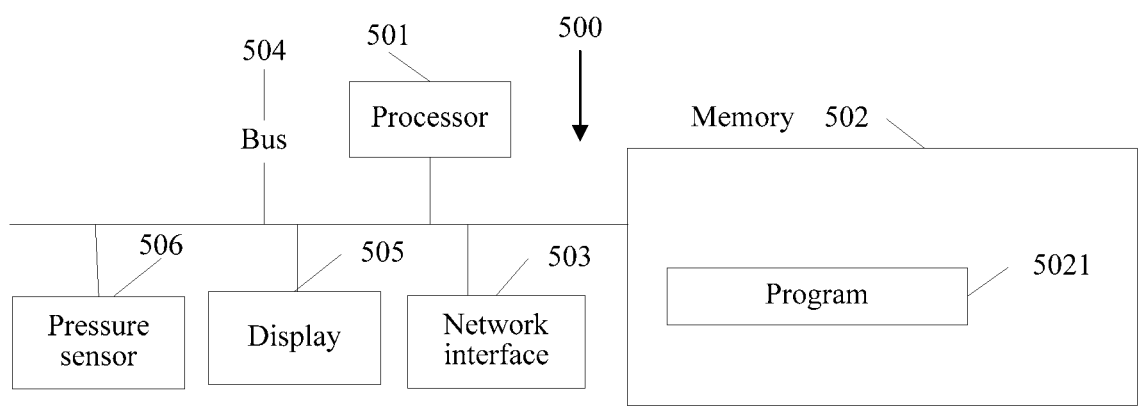
FIG. 10 is a hardware structural diagram of an intelligent terminal according to an embodiment of the present invention.

Referring to FIG. 10, FIG. 10 is a hardware structural diagram of an intelligent terminal according to an embodiment of the present invention. The intelligent terminal 500 includes at least one processor 501 (for example, CPU), a memory 502, at least one network interface 503, at least one communications bus 504, a display 505, and a pressure sensor 506, and the processor 501, the memory 502, the network interface 503, the display 505, and the pressure sensor 506 connect to and communicate with each other by using the communications bus 504, so as to collaborate to complete each function of the intelligent terminal.

The processor 501 is configured to execute an executable instruction module 5021 such as a computer program, an instruction, or other data, stored in the memory 502. The pressure sensor 506 is configured to sense a pressure, and may obtain a value of the pressure. Usually, the pressure sensor 506 is integrated with the display 505. The memory 502 may include a high-speed random access memory (RAM), and may further include a non-volatile memory (non-volatile memory), such as at least an eMMC (Embedded Multi Media Card, embedded multimedia card) memory. Communication and connection between the network device and at least another network element are implemented by means of the at least one network interface 503 (which may be wired or wireless), and the Internet, a wide area network, a local area network, a metropolitan area network, or the like may be used.

The executable instruction module 5021 stores a function program of the above embodiments of the present invention, including but being not limited to methods corresponding to the above steps 101 to 104 and 201 to 204, and methods that may be equivalently replaced. In this way, the processor 501, in combination with the display 505 and the pressure sensor 506, performs any method and an equivalent method in the above embodiments by invoking the function program.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily limited to the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A computer-implemented method for filtering an object, wherein the method comprises:
displaying an object management interface on a display screen, wherein the object management interface contains objects of at least two object types, wherein the at least two object types include a first object type and a second object type, wherein one or more first objects of the first object type are presented on the display screen, and wherein one or more second objects of the second object type are presented on the display screen;

detecting a location on the displayed object management interface that is touched by a user, wherein the detection includes a detected pressure value applied to the touched location;

determining, when the detected pressure value is greater than a preset pressure value threshold and when an object can be identified based on the touched location, a type of the object as the first object type, wherein determining the type of the object as the first object type comprises:

when the detected pressure value is greater than the preset pressure value threshold and when the touched location corresponds to a blank area within the displayed object management interface:

determining, according to a preset rule, a pressure value threshold interval in which the detected pressure value falls within; and determining the first object type according to the determined pressure value threshold interval, wherein in the preset rule, a different threshold interval corresponds to a different object type, the first object type is one of the at least two object types, and the blank area does not contain any object displayed within the object management interface;

obtaining, through filtering in the object management interface, all objects of the first object type; and in response to the obtaining of all objects of the first object type, presenting the obtained objects of the first object type on the display screen and filtering out the one or more second objects of the second object type, wherein objects not of the first object type are not presented on the display screen, wherein at least one obtained object of the first object type on the display screen is not presented on the display screen when detecting the location on the displayed object management interface that is touched by the user, and wherein all the presented objects on the display screen have the same first object type and include the one or more first objects of the first object type.

2. The method according to claim 1, wherein the object comprises a message in a dialog box or a file in a folder.

3. The method according to claim 2, wherein the first object type comprises an image type, an audio type, a video type, a text message type, or a document type.

4. The method according to claim 2, wherein the first object type comprises a network red envelope type or a shared link type.

5. The method according to claim 2, wherein the first object type comprises a contact, and wherein all the objects of the first object type are all objects published by the contact.

6. The method according to claim 1, wherein:

the obtaining, through filtering in the object management interface, all objects of the first object type comprises:

obtaining, through filtering, all the objects of the first object type from all the objects contained in the object management interface; and the presenting the obtained objects of the first object type on the display screen comprises:

arranging and presenting all the objects of the first object type in a forward chronological order on the display screen.

7. The method according to claim 1, wherein:

the obtaining, through filtering in the object management interface, all objects of the first object type comprises:

obtaining, through filtering, all the objects of the first object type from all the objects contained in the object management interface; and the presenting the obtained objects of the first object type on the display screen comprises:

arranging and presenting all the objects of the first object type in a reverse chronological order on the display screen.

8. An apparatus for filtering an object, wherein the apparatus comprises:

at least one processor;

a display screen; and a non-transitory computer-readable storage medium coupled to the at least one processor and storing programming instructions for execution by the at least one processor, the programming instructions instruct the at least one processor to:

display an object management interface on the display screen, wherein the object management interface contains objects of at least two object types, wherein the at least two object types include a first object type and a second object type, wherein one or more first objects of the first object type are presented on the display screen, and wherein one or more second objects of the second object type are presented on the display screen;

detect a location on the displayed object management interface that is touched by a user, wherein the detection includes a detected pressure value applied to the touched location;

determine, when the detected pressure value is greater than a preset pressure value threshold and when an object can be identified based on the touched location, a type of the object as the first object type, wherein determining the type of the object as the first object type comprises:

when the detected pressure value is greater than the preset pressure value threshold and when the touched location corresponds to a blank area within the displayed object management interface:

determining, according to a preset rule, a pressure value threshold interval in which the detected pressure value falls within; and determining the first object type according to the determined pressure value threshold interval, wherein in the preset rule, a different threshold interval corresponds to a different object type, the first object type is one of the at least two object types, and the blank area does not contain any object displayed within the object management interface;

obtain, through filtering in the object management interface, all objects of the first object type; and in response to the obtaining of all objects of the first object type, present the obtained objects of the first object type on the display screen and filter out the one or more second objects of the second object type, wherein objects not of the first object type are not presented on the display screen, wherein at least one obtained object of the first object type on the display screen is not presented on the display screen when detecting the location on the displayed object management interface that is touched by the user, and wherein all the presented objects on the display screen have the same first object type and include the one or more first objects of the first object type.

9. The apparatus according to claim 8, wherein the object comprises a message in a dialog box or a file in a folder.

10. The apparatus according to claim 9, wherein the first object type comprises an image type, an audio type, a video type, a text message type, a document type, a network red envelope type, or a shared link type.

11. The apparatus according to claim 9, wherein the first object type comprises a contact, and wherein all the objects of the first object type are all objects published by the contact.

12. The apparatus according to claim 8, wherein obtaining, through filtering in the object management interface, all objects of the first object type comprises:
   obtaining, through filtering in the object management interface, all the objects of the first object type from all the objects contained in the object management interface; and
   arranging and presenting all the objects of the first object type in a forward chronological order or in a reverse chronological order.

13. A terminal, wherein the terminal comprises:
   a display screen;
   at least one processor;
   a memory; and
   a bus; and
   wherein the display screen, the at least one processor, and the memory are connected to and communicate with each other by using the bus; and
   wherein the display screen is configured to receive a user operation, wherein the memory stores a program and an instruction, and wherein the at least one processor invokes the program and the instruction that are in the memory to perform and implement, according to the user operation received by the display screen, a method comprising:
      displaying an object management interface on a display screen, wherein the object management interface contains objects of at least two object types, wherein the at least two object types include a first object type and a second object type, wherein one or more first objects of the first object type are presented on the display screen, and wherein one or more second objects of the second object type are presented on the display screen;
      detecting a location on the displayed object management interface that is touched by a user, wherein the detection includes a detected pressure value applied to the touched location;
      determining, when the detected pressure value is greater than a preset pressure value threshold and when an object can be identified based on the touched location, a type of the object as first object type, wherein determining the type of the object as the first object type comprises:
         when the detected pressure value is greater than the preset pressure value threshold and when the touched location corresponds to a blank area within the displayed object management interface:
            determining, according to a preset rule, a pressure value threshold interval in which the detected pressure value falls within; and
            determining the first object type according to the determined pressure value threshold interval, wherein in the preset rule, a different threshold interval corresponds to a different object type, the first object type is one of the at least two object types, and the blank area does not contain any object displayed within the object management interface;
      obtaining, through filtering in the object management interface, all objects of the first object type; and
      in response to the obtaining of all objects of the first object type, presenting the obtained objects of the first object type on the display screen and filtering out the one or more second objects of the second object type, wherein objects not of the first object type are not presented on the display screen, wherein at least one obtained object of the first object type on the display screen is not presented on the display screen when detecting the location on the displayed object management interface that is touched by the user, and wherein all the presented objects on the display screen have the same first object type and include the one or more first objects of the first object type.

14. The terminal of claim 13, wherein the object comprises a message in a dialog box or a file in a folder.

15. The terminal of claim 14, wherein the first object type comprises an image type, an audio type, a video type, a text message type, a document type, a network red envelope type, or a shared link type.

16. The terminal of claim 14, wherein the first object type comprises a contact, and wherein all the objects of the first object type are all objects published by the contact.

17. The terminal of claim 13, wherein obtaining, through filtering in the object management interface, all objects of the first object type comprises:
   obtaining, through filtering in the object management interface, all the objects of the first object type from all the objects contained in the object management interface; and
   arranging and presenting all the objects of the first object type in a forward chronological order or in a reverse chronological order.

* * * * *